Jan. 13, 1953 A. J. LARRECQ 2,625,012
GAS TURBINE POWER PLANT, INCLUDING
MULTIPLE FLUID OPERATED TURBINES
Filed April 18, 1950 3 Sheets-Sheet 1
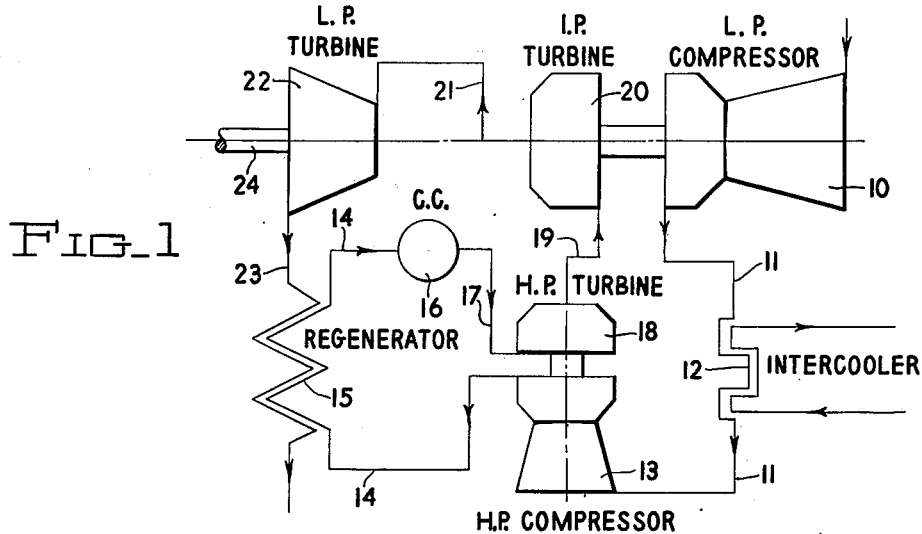
Fig_1
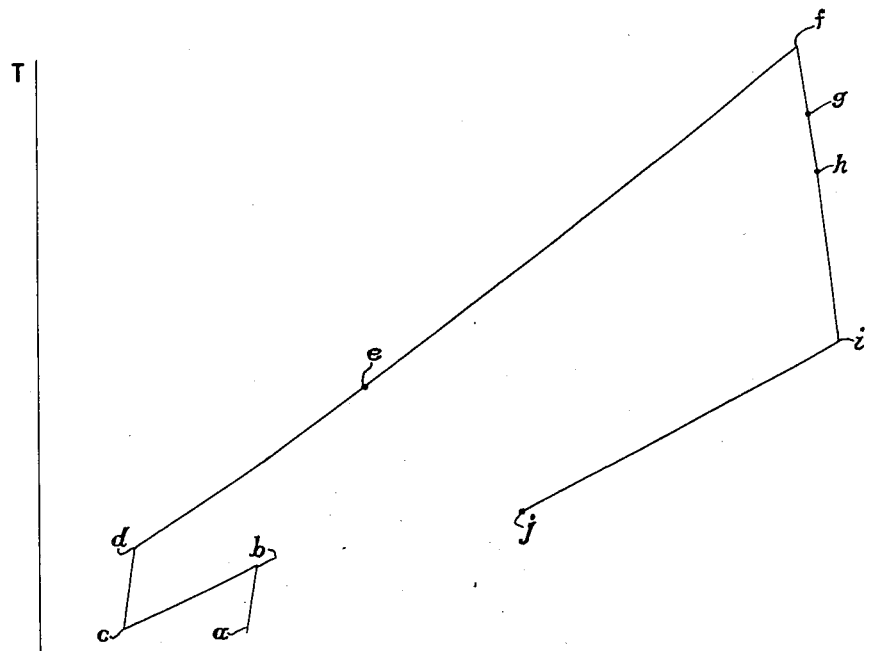
Fig_2
INVENTOR.
ANTHONY JAMES LARRECQ
BY
ATTORNEY

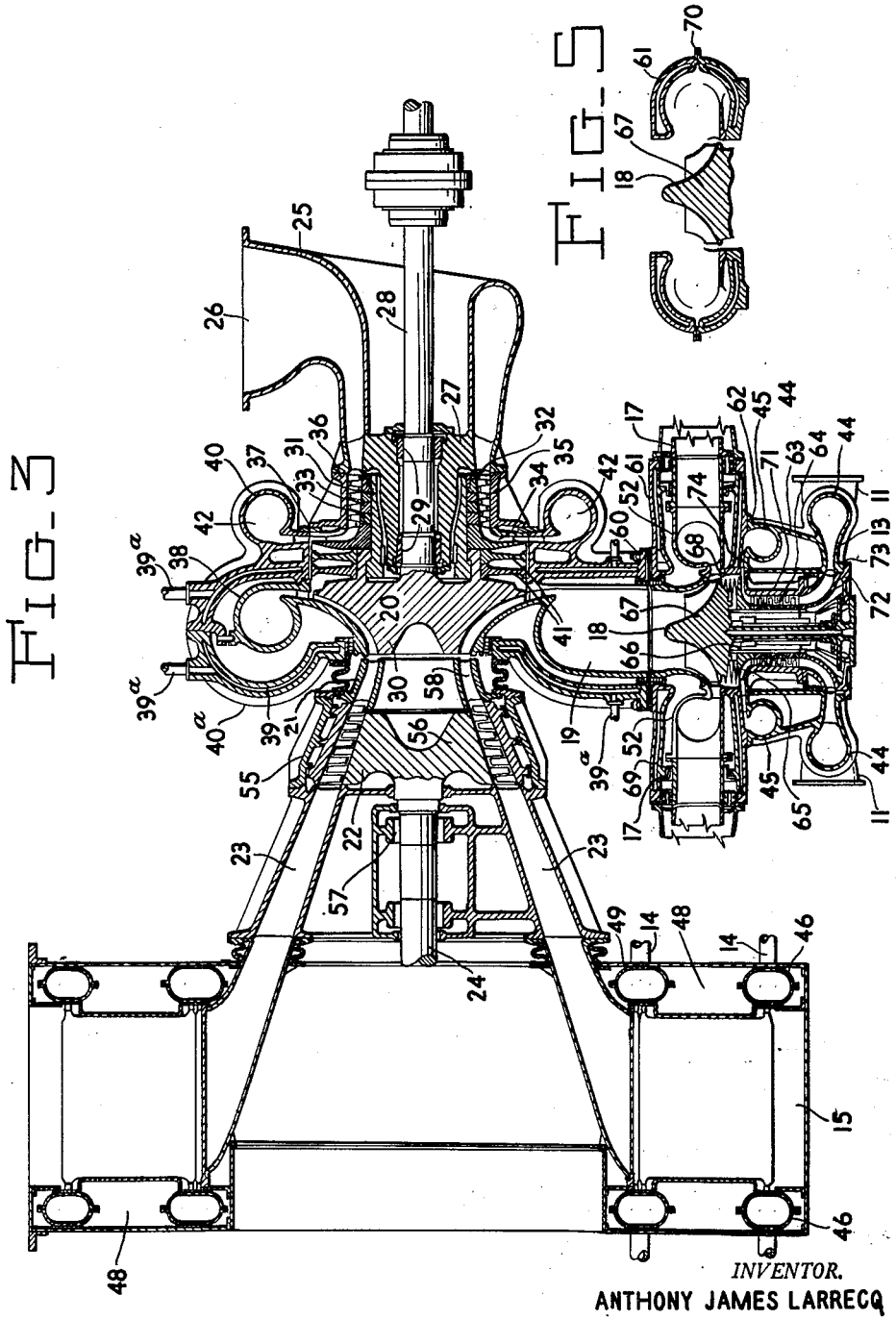

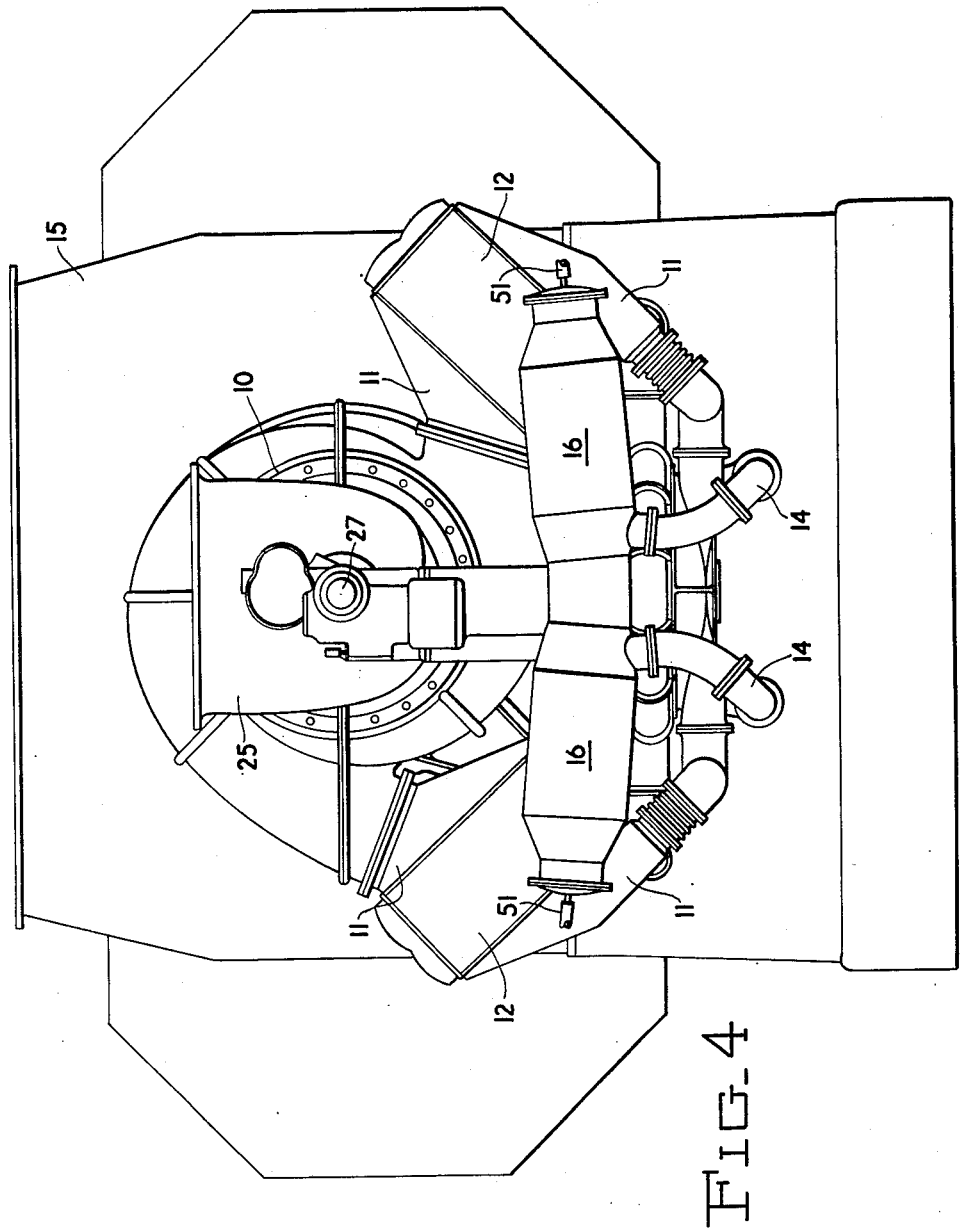

Patented Jan. 13, 1953

2,625,012

UNITED STATES PATENT OFFICE 2,625,012

GAS TURBINE POWER PLANT, INCLUDING MULTIPLE FLUID OPERATED TURBINES

Anthony James Larrecq, Yardley, Pa., assignor to General Engineering and Research Corporation, Trenton, N. J., a corporation of California Application April 18, 1950, Serial No. 156,525

5 Claims. (Cl. 60—39.16)

This invention relates to gas turbine power plants.

It is the principal object of the present invention to provide a gas turbine power plant which is compact for the power output thereof, in which the components may be grouped together on a single bed plate, and which does not require complicated foundations.

It is a further object of the present invention to provide a gas turbine power plant having high and low pressure turbine units which are compactly arranged and with the turbine rotors of both high and low pressure units readily accessible.

It is a further object of the present invention to provide a gas turbine power plant operating on a relatively simple cycle and with which efficient operation can be effected.

It is a further object of the present invention to provide a gas turbine power plant employing high pressure and low pressure operated turbine rotors, which turbine rotors may be readily replaced, thereby increasing the operating life of the power plant.

Other objects and advantageous features of the invention will be apparent from the specification and claims.

The nature and characteristic features of the invention will be more readily understood from the following description, taken in connection with the accompanying drawings forming part hereof, in which:

Figure 1 is a diagrammatic view of a power plant in accordance with the present invention and showing the respective components separated;

Fig. 2 is a temperature-entropy diagram of the power plant shown in Fig. 1;

Fig. 3 is a transverse sectional view showing a power plant in accordance with the present invention and illustrating a specific arrangement of the components;

Fig. 4 is an end elevational view of the power plant shown in Fig. 3, as seen from the right; and Fig. 5 is a fragmentary sectional view of a portion of the high pressure unit taken approximately at right angles to the portion thereof shown on Fig. 3.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to Fig. 1, the gas turbine power plant therein shown includes a low pressure air compressor 10 connected by an air delivery connection 11 in which an intercooler 12 is interposed, to a high pressure air compressor 13. The high pressure compressor 13 is connected by a flexible fluid connection 14 through a regenerator 15 to a combustion chamber 16. A gas delivery connection 17 is provided from the combustion chamber 16 to a high pressure turbine 18, which turbine is mechanically connected to the high pressure compressor 13 in driving relation. A fluid discharge connection 19 from the turbine 18 is connected to an intermediate pressure turbine 20, and the fluid therefrom is delivered through a fluid connection 21 to a low pressure turbine 22.

The intermediate pressure turbine 20 is preferably connected in driving relation to the compressor 10. The low pressure turbine 22 is connected by a fluid connection 23 through the regenerator 15 to exhaust. The low pressure turbine 22 is provided with a power take-off shaft 24 which may be connected to any suitable apparatus to be driven, and at which the power output of the power plant is made available.

Referring now more particularly to Fig. 2, the cycle on which the power plant operates is shown on a temperature-entropy diagram, with values of temperature T as ordinates, and values of entropy S as abscissas.

Air is drawn in from the atmosphere at point $a$ and is compressed by the compressor 10 to the point $b$, along the line $a$—$b$. The air is then cooled to the point $c$, along the line $b$—$c$, in the intercooler 12, and is then compressed to the point $d$, along the line $c$—$d$, in the compressor 13. The air is then heated to the point $e$, along the line $d$—$e$, in the regenerator 15, and its temperature further raised to the point $f$, along the line $e$—$f$, in the combustion chamber 16. The hot gases from the combustion chamber 16 are expanded to the point $g$, along the line $f$—$g$, in the turbine 18, are further expanded to the point $h$, along the line $g$—$h$, in the turbine 20, are further expanded to the point $i$, along the line $h$—$i$, in the turbine 22, and are then cooled to the point $j$, along the line $i$—$j$, in the regenerator 15. The gases at the point $j$ are exhausted to atmosphere.

Referring now more particularly to Figs. 3 and 4, a specific mechanical arrangement of the components diagrammatically illustrated in Fig. 1, is therein shown.

An air inlet housing 25 is provided for the low pressure compressor 10 which has an air inlet opening 26. The housing 25 has secured at the inner end thereof a cantilever cylinder 27 within which a shaft 28 is provided, journaled in bearings 29.

The shaft 28 is connected to the rotor 30 of the intermediate pressure turbine 20. The rotor 30 of the turbine 20 is preferably of the axial inward flow type. The turbine rotor 30 has a sleeve 31 extending therefrom on which rotor sections of the low pressure compressor 10 are secured and held in position by a nut 32. The low pressure compressor 10 preferably comprises a plurality of ring mounted axial stages 33 followed by a centrifugal stage 34. The compressor rotor sections 33 and 34 are enclosed within a housing section 35 having annular flanges 36 to which the inlet housing 25 is secured and flanges 37 for securing it to a casing section 40, within which the rotor 30 is enclosed, to permit of separation at this location. The housing section 35 is also split longitudinally to permit of separation for purposes to be explained.

The intermediate pressure turbine is preferably provided with an inlet scroll 38, carried within the housing section 40, of which the connection 19 forms a part and with which it is in communication. The housing section 40 may also have a separable section 40a for interior access and for ease of construction. The housing section 40 may be provided with suitable cooling jackets 39 for liquid cooling medium circulation, supply and delivery pipes 39a being connected thereto.

In order to prevent leakage between the compressor 10 and the intermediate pressure turbine 20, seals 41 are provided.

It will be noted that by separation at the flanges 37, the entire rotor assembly including the rotor 30, and the compressor sections 33 and 34 and housing section 35, may be axially removed thus permitting accessibility to the rotor and inspection of the blades. Upon separation of the split sections of the housing section 35, the entire compressor blading of the compressor sections 33 and 34 is exposed and the rotor 30 may be slid axially from its supports in the bearings 29. The bearings 29 are shielded from the hot gases passing through the intermediate pressure turbine 20 by the rotor 30 which separates these bearings 29 from the gases.

The housing section 40 has a plurality of take-off scrolls 42 formed therein and with which the stage 34 is in communication for the delivery of air to twin conduits 11, in which intercoolers 12 are interposed.

The conduits 11 on the discharge side of the intercoolers 12 are connected to inlet scrolls 44 of the high pressure compressor 13. The high pressure compressor 13 also has delivery scrolls 45 which are connected by conduits 14 to air inlet manifolds 46 of the regenerator 15. The regenerator 15 is carried in a regenerator housing 48, and may be of any preferred type but is preferably like that shown in the prior application of A. J. Larrecq and E. C. Mernoe, filed April 8, 1949, Serial No. 86,136, now abandoned. The regenerator 15 also has air outlet manifolds 49 which are connected by the connections 14 to a pair of combustion chambers 16.

Fuel for combustion in the interior of the combustion chambers 16 is supplied through fuel inlet pipes 51.

The combustion chambers 16 have their outlets connected to the connection 17, which is connected to inlet scrolls 52 of the high pressure turbine 18.

On the opposite side of the casing section 40 from the turbine rotor 30, a low pressure turbine housing 55 is provided. The low pressure turbine 22, in the housing 55 is preferably a multistage axial flow turbine having a rotor 56 from which the power take off shaft 24 extends. The shaft 24 is supported in overhung bearings 57 carried by the diffuser 23. The turbine 22 has a delivery passageway 58 in communication with the discharge side of the rotor 30 and is connected by the diffuser 23 to the regenerator 15, for the delivery of hot gases thereto. The gases delivered to the regenerator 15, after giving up a portion of the heat therein, to the air delivered from the high pressure compressor 13 for the combustion chambers 16, are then discharged radially to the atmosphere.

The casing 40 of the intermediate pressure turbine 20 has a flanged extension 60 at the lower side thereof on which the high pressure turbine 18 is supported. A housing 61 is provided within which the scroll 52 is carried, and has a flange 62 to which a housing 63 for the high pressure compressor 13 is secured. The housing section 61 may also be provided with a cooling jacket 69. The housing 63 preferably has the scrolls 44 and 45 carried therein.

The high pressure unit preferably has split housing sections separable at flange 70 (see Fig. 5), the compressor 13 having a split stator housing 71 therein and a bearing housing 72 at the outer end secured to a flange 73. A diffuser 74 is also provided.

The rotor of the high pressure compressor 13 is preferably composed of a plurality of axial flow compressor sections 64 in communication at their inlet and with the scroll 44 and a radial and centrifugal section 65 in communication with the scroll 45. The sections 64 and 65 are removably secured on a hollow cylindrical shaft 66 in driven relation.

At the inner end of the shaft 66, the rotor 67 of the high pressure turbine 18 is secured. Seals 68 are provided between the rotor 67 and the rotor section 65 for preventing gas or air leakage.

The turbine rotor 67 is preferably of the liquid cooled type, such as is shown in the prior application of A. J. Larrecq, filed May 9, 1949, Serial No. 92,197, now abandoned.

It will be seen that by separation of the bearing housing 72 from the compressor housing 63 at the flange 73, the high pressure rotor assembly, including the rotor 67, and the compressor sections 64 and 65, and the bearing housing 72 can be removed, thus permitting accessibility to the rotor 67 and inspection of the blades. Upon separation of the split sections of the stator housing 71, the compressor blading of the compressor sections 64 and 65 is exposed, and the rotor 67 may be removed for replacement of the compressor sections 64 and 65 and of the seal 68 and of the turbine rotor 67, if required.

It will be seen that the high pressure unit may be parted at the flange 70 for replacement of the nozzle 52 and at the flange 62 for replacement of the diffuser 74.

I claim:
1. In a gas turbine power plant having low pressure and high pressure rotary compressors and high, intermediate and low pressure turbines with an intercooler interposed between the compressors, an exhaust gas heated regenerator between said high pressure compressor and said high pressure turbine and a combustion chamber between said regenerator and said high pressure turbine, the combination comprising axially alined casing sections removably connected together respectively for the rotor of said low pressure turbine, and for the rotors of said intermediate pressure turbine and said low pressure compressor, the rotors of said intermediate pressure turbine and said low pressure compressor being connected together in driving relation, and additional casing sections for the rotors of said high pressure turbine and said high pressure compressor extending radially from and removably connected to one of said first mentioned casing sections, the rotors of said high pressure turbine and said high pressure compressor being connected together in driving relation.

2. In a gas turbine power plant having low pressure and high pressure rotary compressors and high, intermediate and low pressure turbines with an intercooler interposed between the compressors, an exhaust gas heated regenerator between said high pressure compressor and said high pressure turbine and a combustion chamber between said regenerator and said high pressure turbine, the combination comprising axially alined casing sections removably connected together respectively for the rotor of said low pressure turbine and for the rotors of said intermediate pressure turbine and said low pressure compressor, the rotors of said intermediate pressure turbine and said low pressure compressor being connected together in driving relation, a regenerator housing connected to the casing section for the low pressure turbine, and additional casing sections for the rotors of said high pressure turbine and said high pressure compressor extending radially from and removably connected to one of said first mentioned casing sections, the rotors of said high pressure turbine and said high pressure compressor being connected together in driving relation.

3. In a gas turbine power plant having low pressure and high pressure rotary compressors and high, intermediate and low pressure turbines with an intercooler interposed between the compressors, an exhaust gas heated regenerator between said high pressure compressor and said high pressure turbine and a combustion chamber between said regenerator and said high pressure turbine, the combination comprising axially alined casing sections removably connected respectively for the rotor of said low pressure turbine, and for the rotors of said intermediate pressure turbine and said low pressure compressor, the rotors of said intermediate pressure turbine and said low pressure compressor being connected together in driving relation, the casing section for said low pressure compressor being separable for interior access, additional inner and outer alined casing sections for the rotors of said high pressure turbine and said high pressure compressor extending radially from one of said first mentioned casing sections, the rotors of said high pressure turbine and said high pressure compressor being connected together in driving relation, and the additional casing section for the high pressure compressor being separable for interior access.

4. In a gas turbine power plant having combustion chambers for the production of combustion gases at high temperature and pressure for energy extraction, a first housing section, a second housing section axially alined with a portion of said first housing section and removably connected thereto, a compressor rotor in said second housing section, and a turbine rotor axially alined with said compressor rotor and connected thereto in driving relation, said turbine rotor being disposed within said first housing and removable therefrom with said compressor rotor upon separation of said housing sections, and the housing section for said compressor rotor having separable portions for access to said rotor.

5. In a gas turbine power plant, a turbine casing section, a housing extending from one side of said casing section, a turbine rotor in said casing section and having a shaft supported by said housing, a second turbine rotor in said casing section having an exhaust connection for the delivery of fluid to said first mentioned turbine rotor, a compressor housing section extending from and removably connected to the opposite side of said casing section and having compressor rotor sections axially alined with and driven by said second turbine rotor, and additional inner and outer alined housing members removably connected to said casing section and extending radially outwardly therefrom, a high pressure turbo-compressor unit in said additional housing members, and combustion chambers externally disposed with respect to said casing section and connected to said high pressure unit.

ANTHONY JAMES LARRECQ.

REFERENCES CITED

The following references are of record in the file of this patent:

UNITED STATES PATENTS

| Number | Name | Date |
|---|---|---|
| 853,124 | Schaun | May 7, 1907 |
| 2,073,191 | Belluzzo | Mar. 9, 1937 |
| 2,159,422 | Buchi | May 23, 1939 |
| 2,168,726 | Whittle | Aug. 8, 1939 |
| 2,486,731 | Büchi | Nov. 1, 1949 |
| 2,488,783 | Stalker | Nov. 22, 1949 |